United States Patent [19]

Nagasaki

[11] Patent Number: 5,289,289
[45] Date of Patent: Feb. 22, 1994

[54] IMAGE DATA CODING APPARATUS AND CODING METHOD FOR DYNAMIC-IMAGE DATA

[75] Inventor: Tatsuo Nagasaki, Yokohama, Japan

[73] Assignee: Olympus Optical Co., Ltd., Tokyo, Japan

[21] Appl. No.: 644,248

[22] Filed: Jan. 22, 1991

[30] Foreign Application Priority Data

Jan. 23, 1990 [JP] Japan ............................. 2-12970

[51] Int. Cl.$^5$ ............................................. H04N 7/12
[52] U.S. Cl. ...................................... 358/432; 368/412
[58] Field of Search ............... 358/133, 135, 136, 909, 358/426, 432; 382/56; 364/725, 726; H04N 7/12

[56] References Cited

U.S. PATENT DOCUMENTS

| | | | |
|---|---|---|---|
| 4,704,628 | 11/1987 | Chen et al. | 358/136 |
| 4,933,763 | 6/1990 | Chantelou | 358/136 |
| 5,126,962 | 6/1992 | Chiang | 382/56 |

Primary Examiner—Stephen Brinich
Attorney, Agent, or Firm—Frishauf, Holtz, Goodman & Woodward

[57] ABSTRACT

The image data coding apparatus has an image pickup system for generating at least dynamic images. The apparatus further comprises a data processing section, two transforming sections, a quantizing section, and a coding section. The data processing section three-dimensionally arranges image data for several adjoining frames among the dynamic image data as three-dimensional image data, divides the three-dimensional image data into several three-dimensional blocks with a specified size, and outputs each three-dimensional block data. The first transforming section applies three-dimensional orthogonal transform to the three-dimensional block data and outputs three-dimensional transform coefficient data. The second transforming section transforms the three-dimensional transform coefficient data into one-dimensionally-arranged transform coefficient data. The quantizing section quantizes the one-dimensionally-arranged transform coefficient data with a specified quantization width and generates quantization output. The coding section codes the quantization output and generates coding output.

12 Claims, 16 Drawing Sheets

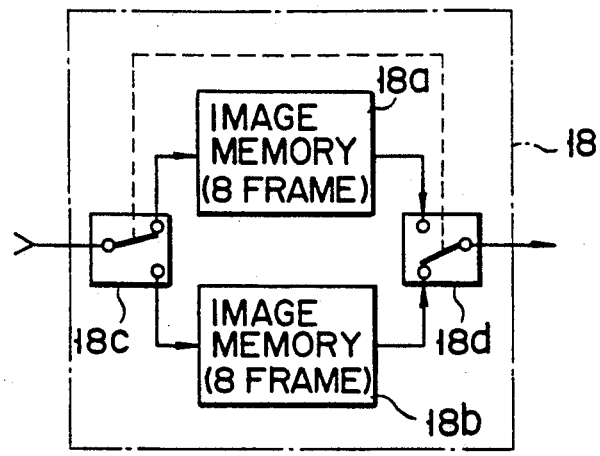
F I G. 1B
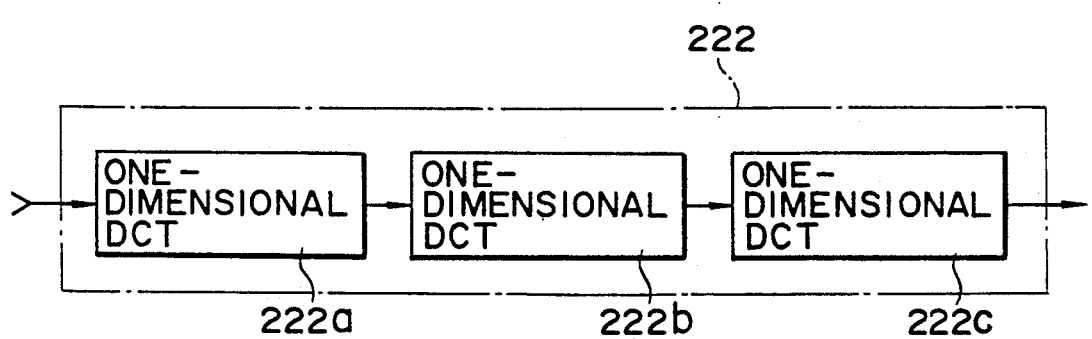
F I G. 1C
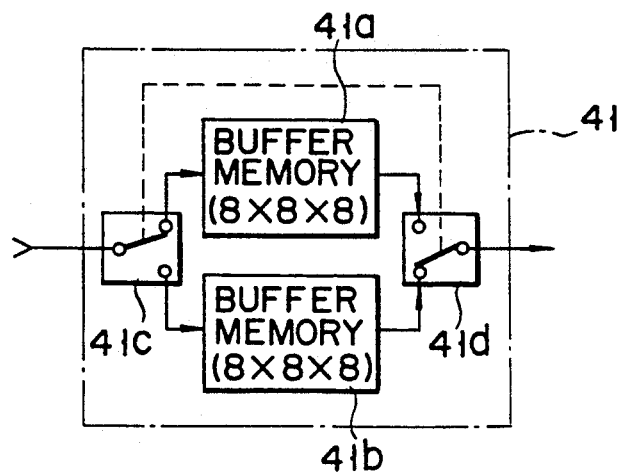
F I G. 1D

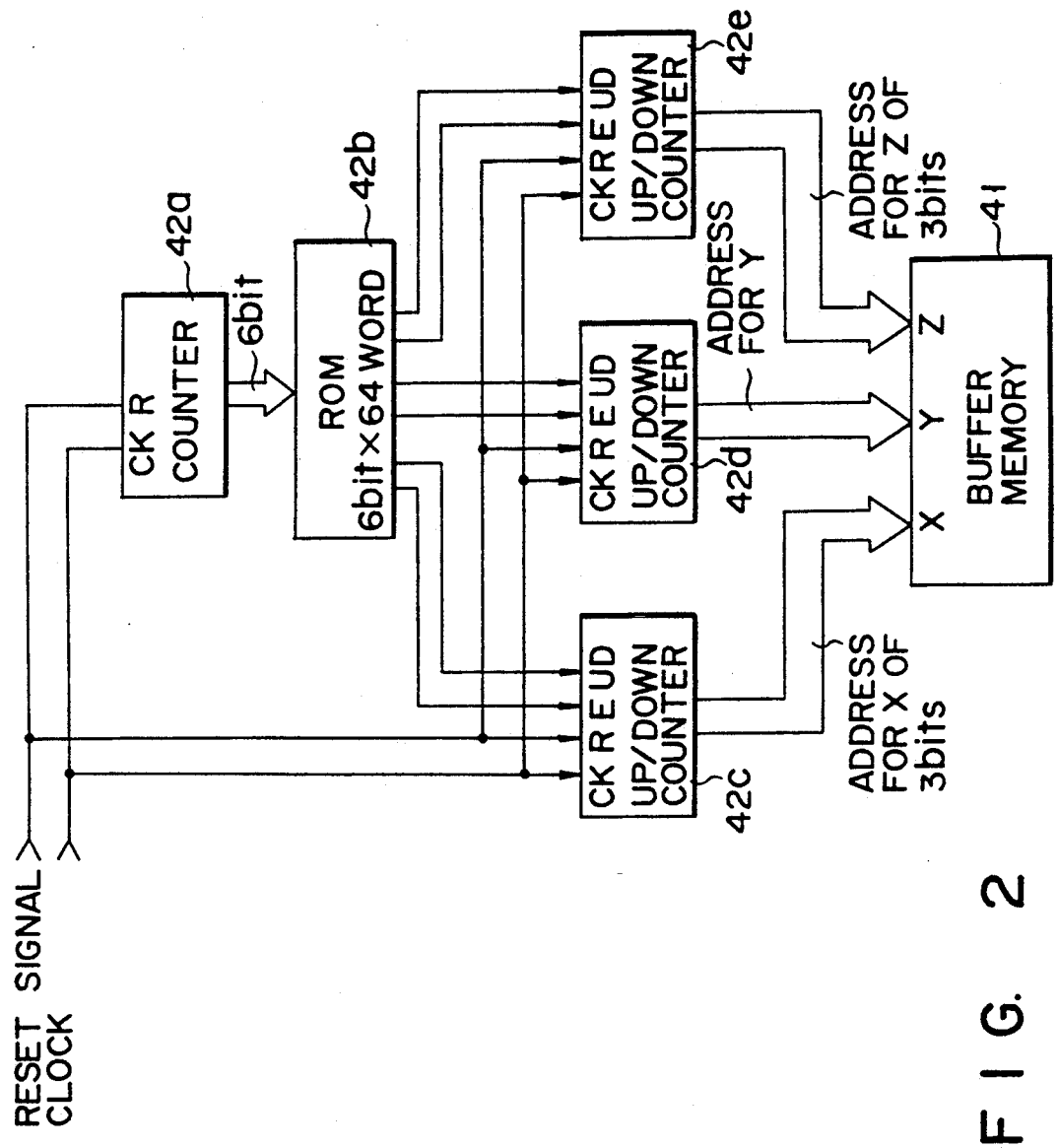
F I G. 2

{ THE ARROW "⟶" REPRESENTS THE SCANNING DIRECTION. THE CIRCLE "O" REPRESENTS THE POSITION OF DCT COEFFICIENT. }

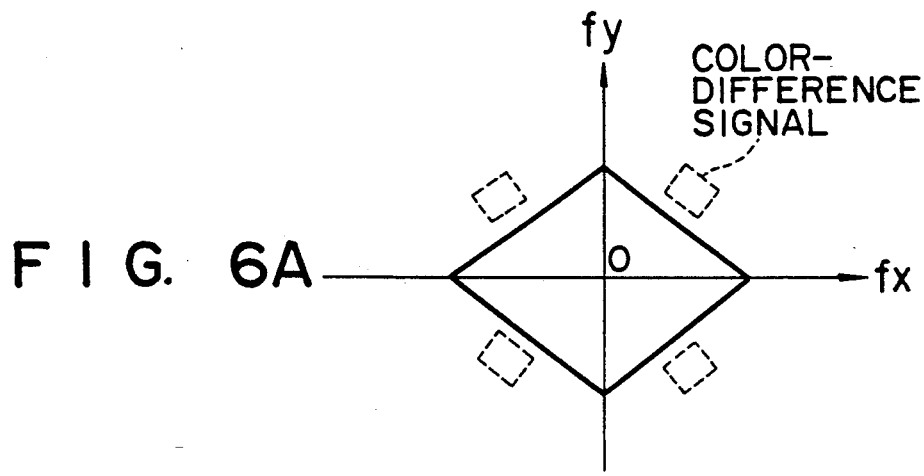
F I G. 6A
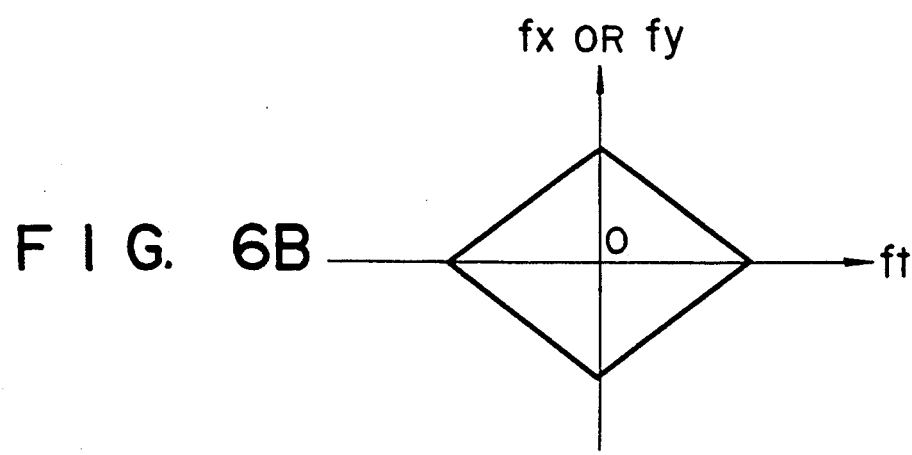
F I G. 6B
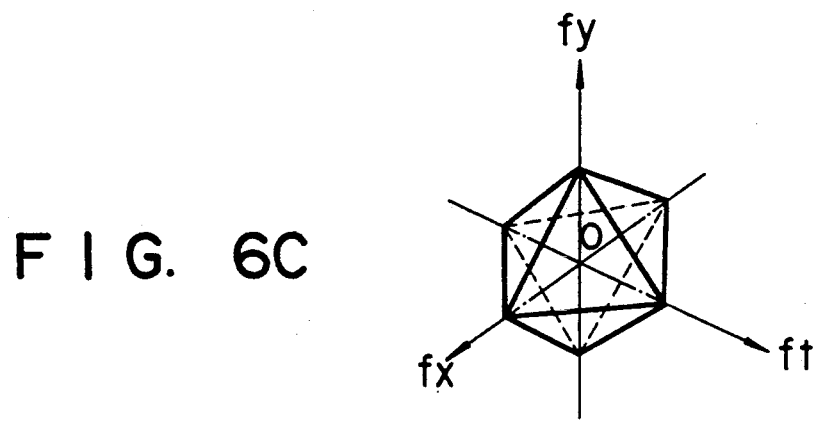
F I G. 6C

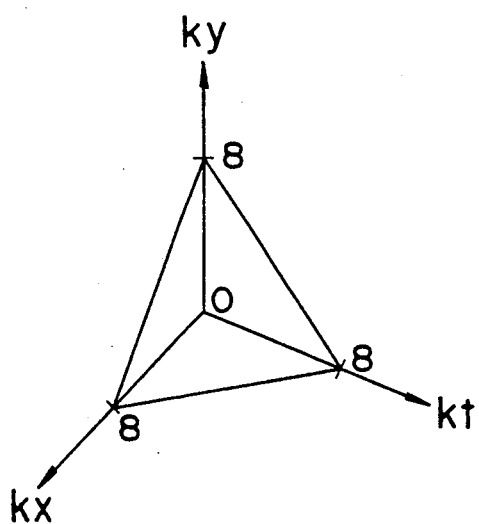
F I G. 7

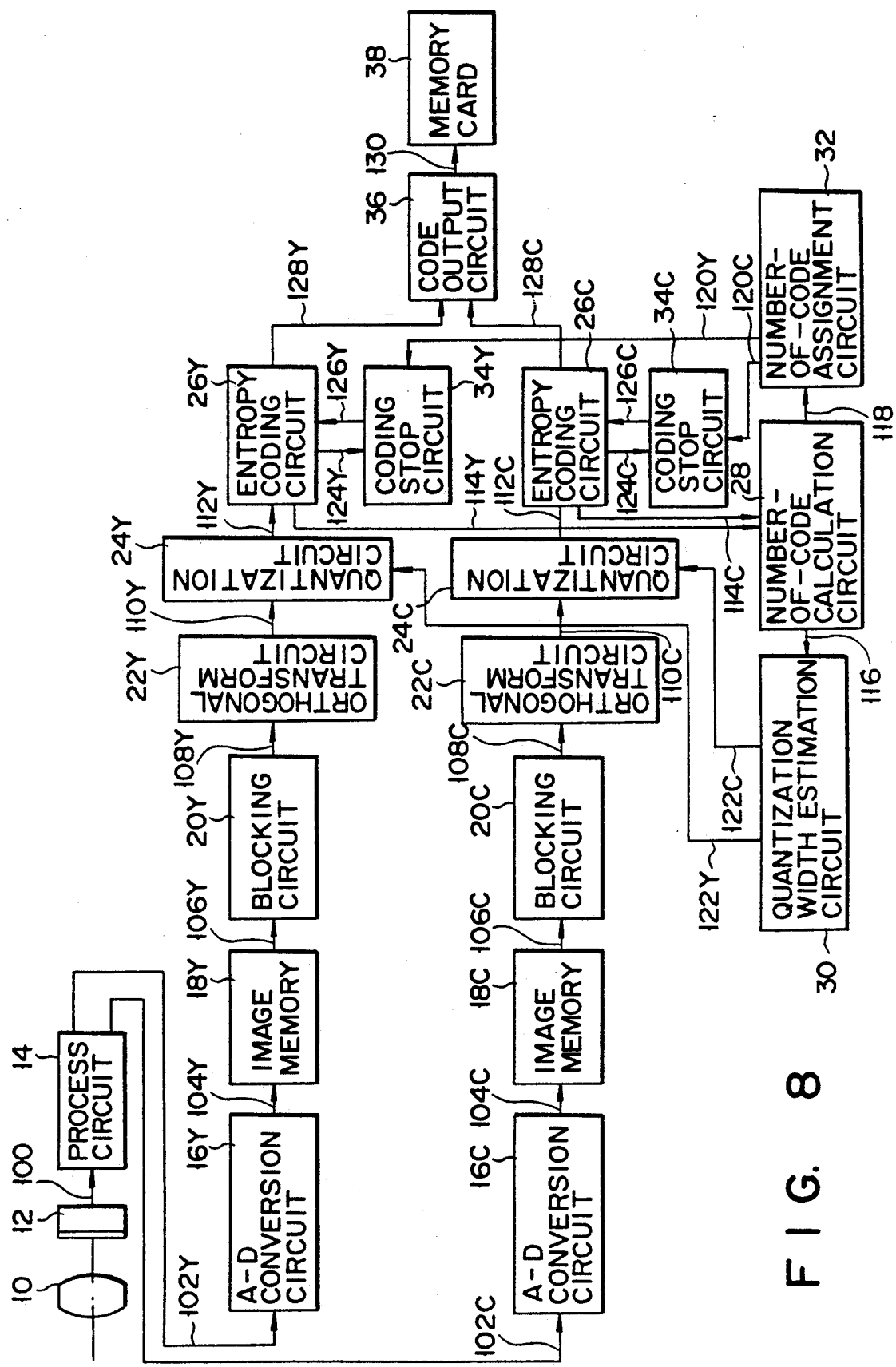
F I G. 8

| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG. 9

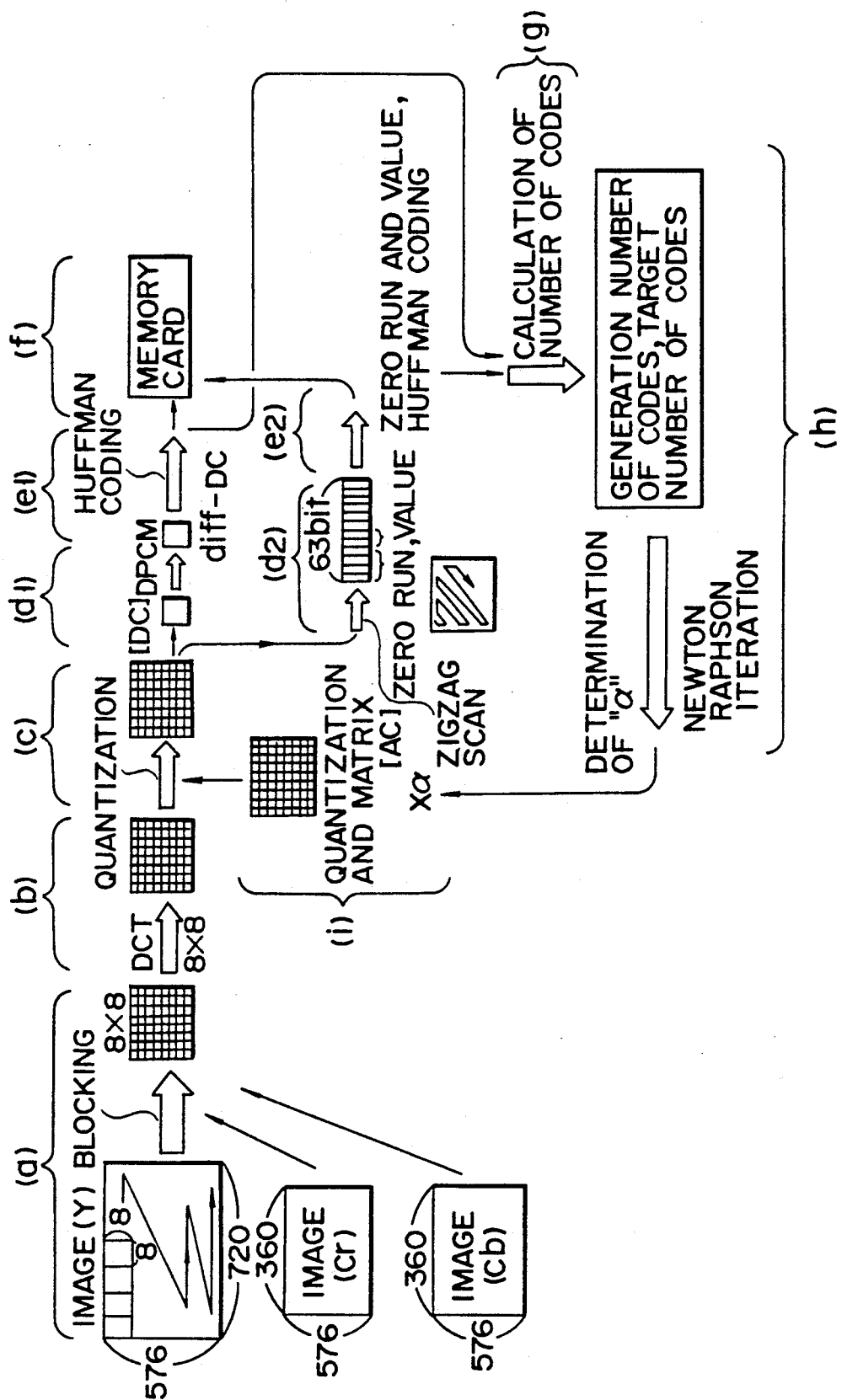
F I G. 12

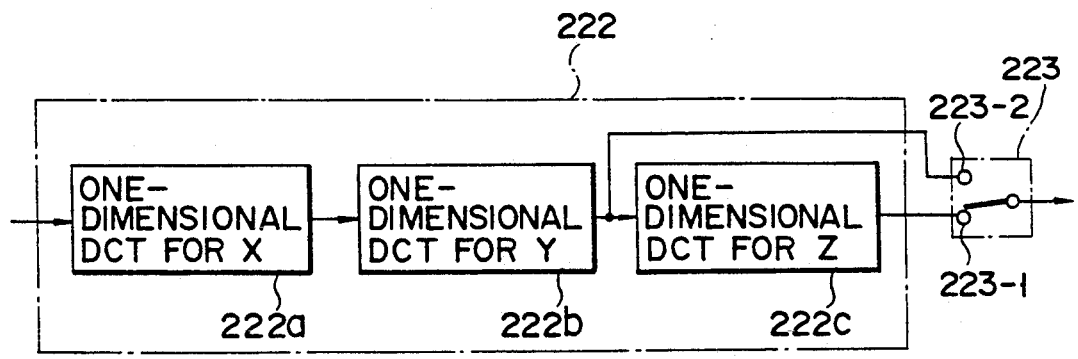
F I G. 13

IMAGE DATA CODING APPARATUS AND CODING METHOD FOR DYNAMIC-IMAGE DATA

BACKGROUND OF THE INVENTION

1. Field of the Invention

This invention relates to a coding apparatus and coding method for efficiently compressing and coding image data, especially dynamic image data.

2. Description of the Related Art

To record the image signal picked up by a solid pickup tube represented by CCD in a memory such as a memory card, magnetic disk, or magnetic tape as digital data, the amount of data becomes enormous. Therefore, to record many frame images within a range of limited recording capacity, it is necessary to compress the obtained image signal data in some ways.

For example, a digital electronic still camera stores photographed images in a data storage medium such as a memory card or magnetic disk instead of a silver film as digital data. Therefore, the number of image frames to be recorded in a memory card or magnetic disk drive is specified and recording of the images equivalent to the specified number of frames must be assured.

Also, a digital VTR (video tape recorder) must be able to record the specified number of frames independently of the amount of image data per frame. That is, it is necessary to securely record still or dynamic images equivalent to the required number of frames.

Moreover, the time to record and reproduce data should be short and constant. Especially for dynamic images, this is also important in order to prevent images of the next frame from missing.

The coding method obtained by combining orthogonal transform coding and entropy coding is popular as an image data compressing method meeting the above conditions.

The following is the outline of the method studied in international standardization of still image coding which is a typical example of the above method.

In this method, image data for one frame is first divided into blocks with the specified size and two-dimensional DCT (discrete cosine transform) is applied to each block as orthogonal transform. Then linear quantization is executed according to each frequency component and Huffman coding is applied to the quantized value as entropy (information content per message) coding. In this case, for the direct-current component, differential value from the direct-current component of adjoining blocks is Huffman-coded.

For the alternating-current component, Huffman coding is performed by scanning from low to high frequency components, which is called zigzag scan, and by using consecutive invalid component values (value of 0) and the following valid component values obtained. This is the basic part of this system.

Only with this basic part, however, the number of codes is not kept constant for each frame because Huffman coding which is entropy coding is used.

Therefore, the following method is proposed to control the number of codes. In this method, first, said basic part is processed and also the total number of codes generated in the entire screen is obtained. And the optimum quantization width to access the purposed number of codes for the DCT coefficient is estimated with the total number of codes and the purposed number of codes. Then, the processing of said basic part is repeated beginning with quantization, using the quantization width.

And the optimum quantization width to access the purposed number of codes is estimated again with the total number of codes generated this time, that of codes precedently generated, and the purposed number of codes. If the estimated quantization width coincides with the precedent quantization width and the total number of codes generated this time is smaller than the purposed number of codes, processing ends and codes are output. If not, processing is repeated using a new quantization width.

The following is the concrete description of the above operation according to FIG. 12. Image data for one frame (the image for one frame proposed in the international standardization plan consists of 720 CX 576 pixels) is divided into blocks with the specified size (e.g. blocks A, B, C, etc. consisting of 8×8 pixels) as shown in (a) and two-dimensional DCT (discrete cosine transform) is applied to each divided block as orthogonal transform as shown in (b) to sequentially store the data in an 8×8 matrix memory. Image data has spatial frequency which is frequency information based on the distribution of variable-density information when it is viewed through a two-dimensional plane.

Therefore, image data is converted into direct-current component DC and alternating-current component AC by executing said DCT. Thus, data showing the value of direct-current component DC is stored at the origin or the position (0, 0) on the 8×8 matrix memory, data showing the maximum frequency of the alternating-current component AC in the horizontal-axis direction at the position (0, 7) on the memory, data showing the maximum frequency of the alternating-current component AC in the vertical-axis direction at the position (7, 0) on the memory, and data showing the maximum frequency of the alternating-current component AC in the diagonal direction at the position (7, 7) on the memory. At the intermediate position, frequency data in the direction related by each coordinate position is stored so that data in will appear beginning with the lowest-frequency data from the origin side.

The linear quantization is executed (c) according to each frequency component by dividing the data stored in each coordinate position in this matrix by the quantization width for each frequency component obtained by multiplying the specified quantization matrix by the quantization width coefficient Ca, and Huffman coding is applied to the quantized values as the entropy coding. In this case, for the direct-current component DC, the differential value from the direct-current component of adjoining blocks is expressed by a group number (number of additional bits) and additional bits, the group number is Huffman-coded, and the obtained code language and the additional bits are combined to generate coded data (d1, d2, e1, e2).

The coefficient (value other than 0) also effective for the alternating-current component AC is expressed by a group number and additional bits.

Therefore, for the alternating-current component AC, Huffman coding is performed by scanning from low to high frequency components, which is called zigzag scan, and by using consecutive invalid (value of 0) components (run number of zeros) and the group number of the following valid component value obtained to generate coded data by combining the obtained code language and additional bits.

Huffman coding is executed by coding data obtained by assigning bits to data for said direct-current component DC and alternating-current component AC per frame image so that the minimum number of bits will be given to the data most frequently generated in the data distribution and the maximum number of bits will be given to the data most rarely generated in it.

This is the basic part of this system.

Only with this basic part, however, the number of codes is not kept constant for each image because Huffman coding which is entropy coding is used. Therefore, the following processing is used to control the number of codes.

First, said basic part is processed using the temporary quantization width coefficient $\alpha$ and, at the same time, the total number of codes (total number of bits) generated in the entire screen of one frame is obtained (g).

The optimum quantization width coefficient $\alpha$ to access the purposed number of codes for the DCT coefficient is estimated with said total number of codes, purposed number of codes, and temporary quantization width coefficient by means of Newton Raphson Iteration (h).

Secondly, the processing of said basic part beginning with quantization is repeated using the quantization width coefficient $\alpha$ (i).

Thirdly, the optimum quantization width coefficient $\alpha$ is estimated again with the total number of codes generated this time, total number of codes precedently generated, purposed number of codes, quantization width coefficient $\alpha$ used this time, and quantization width coefficient $\alpha$ precedently used. If the estimated quantization width coefficient $\alpha$ coincides with the precedent quantization width coefficient $\alpha$ and the total number of codes generated this time is smaller than the purposed number of codes, processing ends and coded data generated this time is output and stored in a memory card (f). If not, the quantization width coefficient $\alpha$ is renewed and processing is repeated using the new quantization width $\alpha$.

As mentioned above, for a digital electronic still camera, for example, the number of images to be recorded in a memory card, magnetic disk drive, or magnetic tape must be assured. Therefore, image data is compressed and recorded. However, the processing time should be as short as possible and constant in view of operability.

Also, it is desired that image data can efficiently be compressed. These items are required not only for digital electronic still cameras but for other applications.

Said international standard plan system is one of the compression methods meeting the above requirements. In this system, image data can efficiently be compressed by the technique obtained by combining the orthogonal transform coding with entropy coding for each block shown in the example of said basic part. However, because entropy coding is used, there is the disadvantage that the number of codes depends on images and the number of images to be recorded in a memory card or magnetic disk drive is indeterminate.

Also for the method to control the number of codes shown in the example of prior art, there is the disadvantage that not only the processing time is indeterminate but it should generally be increased because the number of pass repetitions of the basic part depends on images. The disadvantage is especially fatal for the system using dynamic images.

SUMMARY OF THE INVENTION

Therefore, it is the object of the present invention to provide a coding apparatus and coding method capable of coding image data so that it will be kept at a certain number of codes within a certain processing time and of practically using image data as dynamic image.

To achieve the above object, one aspect of the present invention is a coding apparatus comprising:

data generating means for generating at least dynamic images;

data processing means for arranging image data three-dimensionally for several frames adjoining each other among the dynamic image data generated by the data generating means as three-dimensional image data, and for dividing the three-dimensional image data into a plurality of three-dimensional blocks of a specified size, so as to output each three-dimensional block data;

first transforming means for applying three-dimensional orthogonal transform to the three-dimensional block data output from the data processing means and for outputting three-dimensional transform coefficient data;

second transforming means for transforming the three-dimensional coefficient data output from the first transforming means into one-dimensionally-arranged transform coefficient data;

quantizing means for quantizing the one-dimensionally-arranged transform coefficient data transformed by the second transforming means with a specified quantization width and for generating quantization output; and coding mean for coding the quantization output generated by the quantizing means and for outputting coded output.

Moreover, another aspect of the present invention is an image data coding method comprising the steps of:

obtaining dynamic image data;

arranging image data three-dimensionally for several adjoining frames among the dynamic data, and dividing the three-dimensionally arranged image data for each frame into blocks for matrix areas of a specified size;

applying three-dimensional orthogonal transform to each of the obtained blocks and output three-dimensional transform coefficient data;

transforming the three-dimensional transform coefficient data into one-dimensionally-arranged transform coefficient data;

quantizing the one-dimensionally-arranged transform coefficient data with a specified quantization width and outputting quantization output; and coding the quantization output.

That is, in the present invention, the obtained dynamic-image data is three-dimensionally arranged by arranging images for several adjoining frames in order, the three-dimensionally arranged image data is divided into blocks for matrix area of a specified size, data in each block is converted into three-dimensional orthogonal transform (DCT) coefficient data, three-dimensional DCT coefficient data, for example, is spirally scanned from the origin of each block about each plane approximated to a spherical surface in the three-dimensional space centering around the origin from, the data showing a value same as or close to the DCT coefficient is transformed into one-dimensional DCT data by grouping data for each plane, and the one-dimensional DCT data is quantized with a temporary quantization width, before the data is entropy-coded, the number of codes for each block and the number of codes for the entire image are calculated, and the number of codes assigned to each block is calculated using the above calculated values to estimate an optimum quantization width (first coding). Then, the orthogonally-transformed transform coefficient is quantized with a new quantization width again before entropy coding is executed so that coding will end before the number of codes assigned to each block through first coding is exceeded.

As mentioned above, this apparatus three-dimensionally arranges images of several adjoining frames for the obtained dynamic images, blocks the three-dimensionally arranged image data for each frame into matrix areas with the specified size to apply three-dimensional orthogonal transform to data of each block, scans three-dimensional DCT coefficient data from the origin of the obtained three-dimensional orthogonal transform coefficient data by spirally scanning each plane approximated to a spherical surface in the three-dimensional space centering around said origin, arranges the data same as or close to the value of DCT coefficient into one-dimensional data by grouping data for each plane, collecting the components in the high-frequency area having the tendency in which zero-run codes continue to realize efficient compression, before first applying statistical processing to the one-dimensionally arranged DCT data for each block thus obtained to examine the information contents for each block and for the entire image required for optimization, secondly starting the processing for optimized coding according to the information obtained through the statistical processing, and sequentially controlling entropy coding so that the required number of codes will be kept while checking the coded output, in order to obtain the coded output as the final output.

That is, images are blocked, the blocked images are converted into three-dimensional DCT coefficient data, the three-dimensional DCT coefficient data to process the three-dimensional DCT coefficient data so that it can efficiently be compressed is arranged into one-dimensional data, the elements of blocked image provided with the one-dimensional arrangement are quantized using the standard quantization width, the transform coefficient obtained through quantization is entropy-coded, a quantization width to obtain the optimum number of codes is estimated with the information for the number of codes for each element of each block obtained through said entropy coding and the information for the number of codes for entire image, the number of codes to be assigned to each element of each block is determined, the optimum coding for images to be processed according to the above is shifted to the processing mode, images are blocked by executing the processing mode, the elements of the blocked image are quantized using said estimated quantization width, the transform coefficient obtained through the quantization is entropy-coded, said elements are entropy-coded within the range of said assigned number of codes on the basis of the number of codes assigned to each element of each block, and images to be processed are output to store all codes, in order to obtain the final output. Thus, the obtained image data can very efficiently be compressed and coded and the data can always be kept at a certain number of codes. Therefore, when the image memory capacity is specified, the specified memory capacity can be assured for the memory capacity of the storing means. Moreover, because the quantity of data for the entire image is obtained through statistical processing before coding is executed according to the obtained quantity of data, processing is completed for two passes—one for statistical processing and the other for coding. Accordingly, coding can be executed within a certain processing time.

Thus, according to the present invention, data can be coded at a high compressibility within a certain processing time so that the data will be kept at a certain number of codes.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1B, 1C, and 1D are block diagrams showing configuration examples of some circuits in FIG. 1A;

FIG. 2 is a block diagram showing an configuration example of the memory control section of FIG. 1A;

FIGS. 6A through 6C are drawings to explain the reason why the scan example in FIGS. 4A through 4J;

FIG. 7 is a drawing to explain the scan example used to transform three-dimensional DCT coefficient data into one-dimensionally-arranged coefficient data;

FIG. 8 is a block diagram showing one circuit configuration when the basic concept of this invention is realized;

FIG. 9 is a drawing to explain zigzag scan for block of $8 \times 8$ pixels;

FIG. 12 is an operational transition diagram to explain the prior art;

FIG. 13 is a block diagram showing an configuration example of the three-dimensional DCT circuit realizing the still image display used for other embodiments of this invention.

DETAILED DESCRIPTION OF THE PREFERRED EMBODIMENTS

Figure 1A:
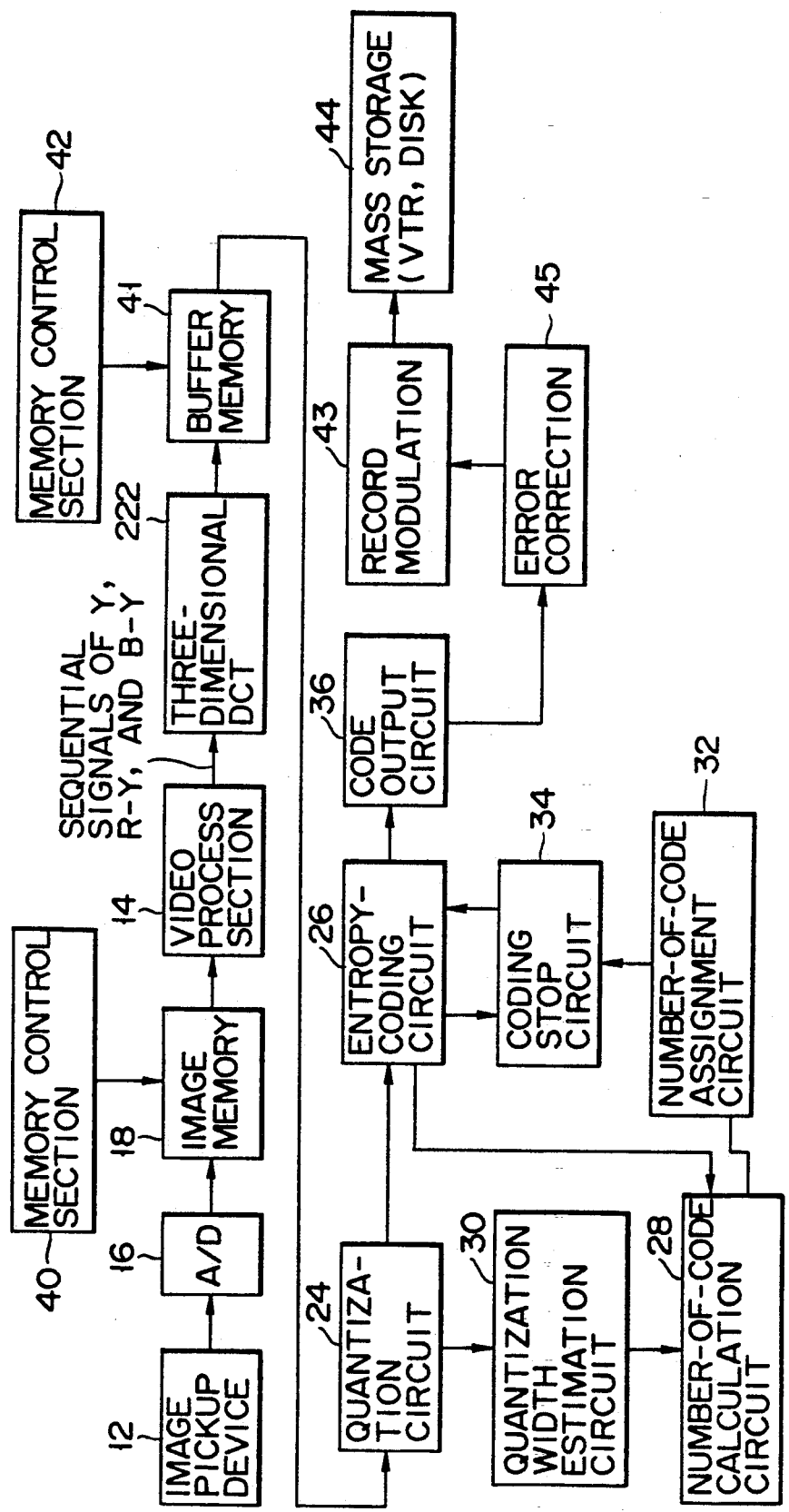
FIG. 1A is a block diagram showing an embodiment of this invention.

The following is the description of the embodiments of this invention according to the drawings.

First, the basic concept of this invention is described for easy understanding of this invention.

That is, this invention executes statistical processing as the first pass processing to estimate an optimum quantization width coefficient and determine the number of codes to be assigned to each block.

Then, this invention executes the final coding as the second pass processing.

In the second pass, data is quantized for each block with the estimated quantization width coefficient and coded and coding is continued by monitoring the number of codes for each block so that the number of codes obtained through the coding will be kept within the number of codes assigned to each block. When the number of codes including the EOB (end of block) code reaches the assigned number of codes, coding of the data in the block ends and coding of data in the next block starts.

Statistical processing estimates an optimum quantization width and determines the number of codes to be assigned to each block. Estimation of optimum quantization width is the processing to make the number of codes roughly (but considerably accurately) approach the purposed number of codes.

By using the optimized quantization width for coding, it is possible to make the number of codes approximately approach the purposed number of codes. In this case, if the number of codes is kept at the purposed number of codes or less, only this processing is enough. However, if the upper limit of the data quantity for one-frame images is specified, the purposed number of codes must not be exceeded by not only one byte but even one bit.

Therefore, an action should be taken when the purposed number of codes is exceeded.

Determination of the number of codes to be assigned to each block is the action, in which the data to be used for fine adjustment when the number of codes for coding exceeds the purposed number of codes is determined. Actually, it is possible to end coding processing unless the number of codes exceeds the purposed number of codes and execute post-processing of coding if it exceeds the purposed number of codes according to the result of execution of coding with the optimum quantization width estimated through statistical processing.

In this case, however, three steps of statistical processing, coding processing, and post-processing are necessary. This not only takes time but requires storage of data so that coding can be separated from post-processing without combining codes of various lengths. Therefore, it is desired to execute fine adjustment during coding processing.

However, it should be avoided to excessively eliminate data, otherwise, image quality is degraded.

Therefore, in the present invention, visual influence is minimized by eliminating redundant data from the high-frequency component of each block.

However, whether or not the number of codes exceeds the purposed number of codes is unknown before coding ends. Therefore, in the present invention, it is judged for each block. This uses the fact that it is confirmed through tests that the relative ratio of the number of codes generated in each block does not largely vary when coding is executed using the optimum quantization width or the quantization estimated through statistical processing. That is, in coding with a temporary quantization width obtained through statistical processing (the temporary quantization width can very roughly be estimated with the purposed number of codes), to use the number of codes generated in each block as the purposed number of codes, the guideline that "the number of codes for the entire image does not exceed the purposed number of codes unless the number of codes generated in each block is exceeded" is set to use the guideline for the criterion for monitoring the number of codes assigned to each block.

When the quantization width and the number of codes to be assigned to each block are determined, coding processing is executed for final coding according to the determined data.

In the coding processing of the present invention, coding is stopped in each block before the number of codes assigned to the block is exceeded.

In coding for each block, checking is executed so that the guideline (assigned number of codes) will not be exceeded while executing coding from low to high frequency components in order. For a block in which the guideline is not exceeded, coding smoothly ends, that is, EOB is output. For a block in which the guideline is exceeded during coding, coding stops without further coding high components, that is, EOB is output. In this case, because EOB is one of Huffman codes, the number of codes including EOB should be kept at the assigned number of codes or less.

Thus, for example, if coding smoothly ends for the half of blocks and coding ends for the remaining block by omitting part of very high frequencies, only a little information is missed and the missing information stays in high-frequency components which has only a little visual influence.

And this system makes it possible to always end coding with two steps of statistical processing and coding processing. Therefore, it is possible to keep the total number of codes at the specified value or less without repeating optimization many times as ever and prevent image quality from degrading.

The following is the description of an embodiment of the apparatus using the above theory.

For easy understanding, the example is first described in which the theory is applied to a digital electronic still camera handling still images.

FIG. 8 shows a block diagram of an embodiment in which the image at a coding apparatus of this invention is applied to a digital electronic still camera. The mechanism, illustration, and description of the digital electronical still camera is omitted because it is not related to the present invention.

In FIG. 8, the number 10 represents a camera lens and the number 12 an image pickup device such as CCD. They are installed behind the camera lens 10. An optical image focused on the imaged pickup device 12 by the camera lens 10 is converted into image signals. The number 14 represents a process circuit which receives the image signal obtained by the image pickup device 12 through the signal line 100, divides the image signal into color signal components Y, R-Y (hereafter called Cr (chroma red)), and B-Y (hereafter called Cb (chroma blue)), and executes gamma control and white balancing.

The number 16Y represents an A/D conversion circuit for digital conversion of the signal for Y component and the number 16C an A/D conversion circuit for digital conversion of the signal for Cr and Cb components. Among the color image signal components output from the process circuit 14, Y component passes through the signal line 102Y, which is A/D-converted by the A/D conversion circuit 16Y and Cr and Cb components pass through the signal line 102C, which are A/D-converted by the A/D conversion circuit 16C.

The numbers 18Y and 18C represent an image memory for Y component and Cr and Cb components respectively. Each memory has the capacity to store images for one or more frames. Outputs of the A/D conversion circuits pass through the signal lines 104Y and 104C respectively, which are recorded in the corresponding image memories 18Y and 18C.

The numbers 20Y and 20C represent a blocking circuit for Y component and Cr and Cb components respectively. The blocking circuits 20Y and 20C receive the image data (for one frame) from the corresponding image memories 18Y and 18C through the respectively-corresponding signal lines 106Y and 106C and execute blocking to divide the image data into blocks with the specified size. In this case, each block is provided with the size of 8×8 pixels as an example. However, the block size is not restricted to 8×8 pixels. And it is also permitted that the block size differs in Y and C (chroma system). In this embodiment, the blocking circuit 106C of the chroma system blocks the entire image data for Cr component before blocking the image data for Cb components.

The numbers 22Y and 22C are an orthogonal transform circuit for Y component and Cr and Cb components respectively, which receive each image data blocked by the blocking circuits 20Y and 20C of the respectively-corresponding system for component through the signal lines 108Y and 108C of each system and applies two-dimensional orthogonal transform to the blocked image data every block. The orthogonal transform uses cosine transform, sine transform, Fourier transform, and Hadamard transform. Image data as transform coefficient is obtained through orthogonal transform.

The numbers 24Y and 24C represent a quantization circuit for Y component and Cr and Cb components respectively. When receiving the image data (transform coefficient) in the orthogonal transform circuits 22Y and 22C through the corresponding signal lines 110Y and 110C of each system, the quantization circuits 24Y and 24C execute quantization of transform coefficient at the first time with the value obtained by multiplying the previously-set quantization width for each frequency component by the previously-set quantization width coefficient $\alpha$ and at and after the second time with the optimum quantization width coefficient $\alpha$ determined through the previous processing.

The numbers 26Y and 26C represent an entropy-coding circuit for Y component and Cr and Cb components respectively. The entropy-coding circuits 26Y and 26C entropy-code the transform coefficient obtained through the quantized signal lines 112Y and 112C.

The entropy coding uses Huffman coding and arithmetic coding. Because the entropy coding is variable-length coding, the number of codes for the entire number-of-code image for each block changes every image.

Though the type of entropy coding to be used is not related to the present invention, an example of using Huffman coding is shown below.

The entropy-coding circuits 26Y and 26C execute scanning from low to high frequency components using the technique called zigzag scan which scans the input quantized transform coefficient in the sequence shown in FIG. 9.

The data for the first direct-current component in the scan sequence in FIG. 9 is output by Huffman-coding the differential value from the direct-current component of the block entropy-coded immediately before.

For the alternating-current component, the second through the 64th transform coefficients in the scan sequence in FIG. 9 are sequentially checked. If a coefficient with the transform other than 0 (that is, valid) is found, the coefficient is provided with two-dimensional Huffman coding using consecutive number of zero coefficients (zero run) present immediately before the above coefficient and the value of the valid coefficient before it is output.

If invalid coefficients continue from a certain coefficient to the 64th coefficient, the code EOB showing the end of block is output. When the stop signal is input, coding is stopped and EOB is output and the number of codes generated in the block is output to the number-of-code calculation circuit 28 through the signal lines 114Y and 114C.

The number-of-code calculation circuit 28 accumulates the number of codes for each block of the input Y, Cr, and Cb components, collects the data for the number of codes for each block and calculates the number of codes for the entire image for one frame, and outputs the data for the number of codes for the entire image to the quantization width estimation circuit 30 through the signal line 116 and the data for the number of codes for each block and that for the number of codes for the entire image to the number-of-code assignment circuit 32 through the signal line 118. The number 30 represents a quantization width estimation circuit. The circuit 30 estimates the optimum quantization width coefficient $\alpha$ to approach the target number of codes using th Newton-Raphson iteration method, for example, according to the number of codes for the entire image input from the number-of-code estimation circuit 28 and the target number of codes which is the maximum allowable data quantity for one-frame images by considering the previously-set quantization width coefficient which is actually used this time.

The number 32 represents a number-of-code assignment circuit. The circuit 32 calculates the number of codes to be assigned to each block according to the number of codes for image data for each block input from the number-of-code calculation circuit 28, the number of codes for the entire image, and the target number of codes, and outputs the calculated number of codes to the coding stop circuits 34Y and 34C. For the calculation method in this case, for example, the target number of codes is proportionally distributed according to the ratio of the number of codes for each block.

For example, the number of codes for a block is determined by multiplying the number of codes of the block by the target number of codes and dividing the product by the number of codes for the entire image. The number-of-code assignment circuit 32 has the table of information for number of codes and that of data for number of codes to be assigned to each block, which rewrites the number-of-code information for the block position concerned in the table of information for number of codes to the number-of-code information input from the number-of-code calculation circuit 28 while calculating the number of codes to be assigned to each block according to the number of codes for each block input from the number-of-code calculation circuit 28, the number of codes for the entire image, and the target number of codes, and storing the data for the calculated number of codes to be assigned to each block in the table of data for number of codes to be assigned to each block.

The number of codes to be assigned to each block in the table of data for number of codes to be assigned to each block is given to the coding stop circuits 34Y and 34C when the block concerned is entropy-coded.

The coding stop circuits 34Y and 34C have the functions to subtract the number of codes for each block given by the number-of-code assignment circuit 32 from the assigned number of codes, output a stop signal through the signal lines 126Y and 126C if the remaining assigned number of codes is smaller than the number of codes obtained by totaling the number of codes to be sent and the code EOB, and end coding of data for the block.

Therefore, the coding stop circuits 34Y and 34C reference the assigned number of codes. If the number of codes does not exceed the assigned number of codes after sending the input number of codes to be sent and the code EOB, the circuits do not stop coding but they end coding of data for the block, and they subtract the number of codes to be sent from the number of codes assigned to the block concerned.

The number 36 represents a code output circuit. The code output circuit 36 combines variable-length codes input from the entropy coding circuits 26Y and 26C through the signal lines 128Y and 128C and writes the combined codes in the memory card 38 through the signal line 130.

This system first executes statistical processing to check the information content for each block necessary for optimization and that for the entire one-frame image and starts the processing to execute optimized coding according to the information obtained through the statistical processing.

Therefore, the following procedures are executed: blocking of an image, quantization of elements of the blocked image using the standard quantization width coefficient Ca, entropy-coding of the transform coefficient obtained through quantization, estimation of the coding width coefficient u required to obtain the optimum number of codes according to the number-of-code information for each element of each block obtained through the entropy coding, determination of assigned number of codes for each element of each block, shifting of optimum coding for the image to be processed based on the above mentioned to processing mode, blocking of an image through execution of the processing mode, quantization of elements of the blocked image using the estimated quantization width Ca, entropy-coding of the transform coefficient obtained through the quantization, and output processing to store all codes of the image to be processed. All of the above operations are controlled by a control section which is not illustrated.

The above functions of the control section can easily be realized using a microprocessor (CPU).

Figure 10:
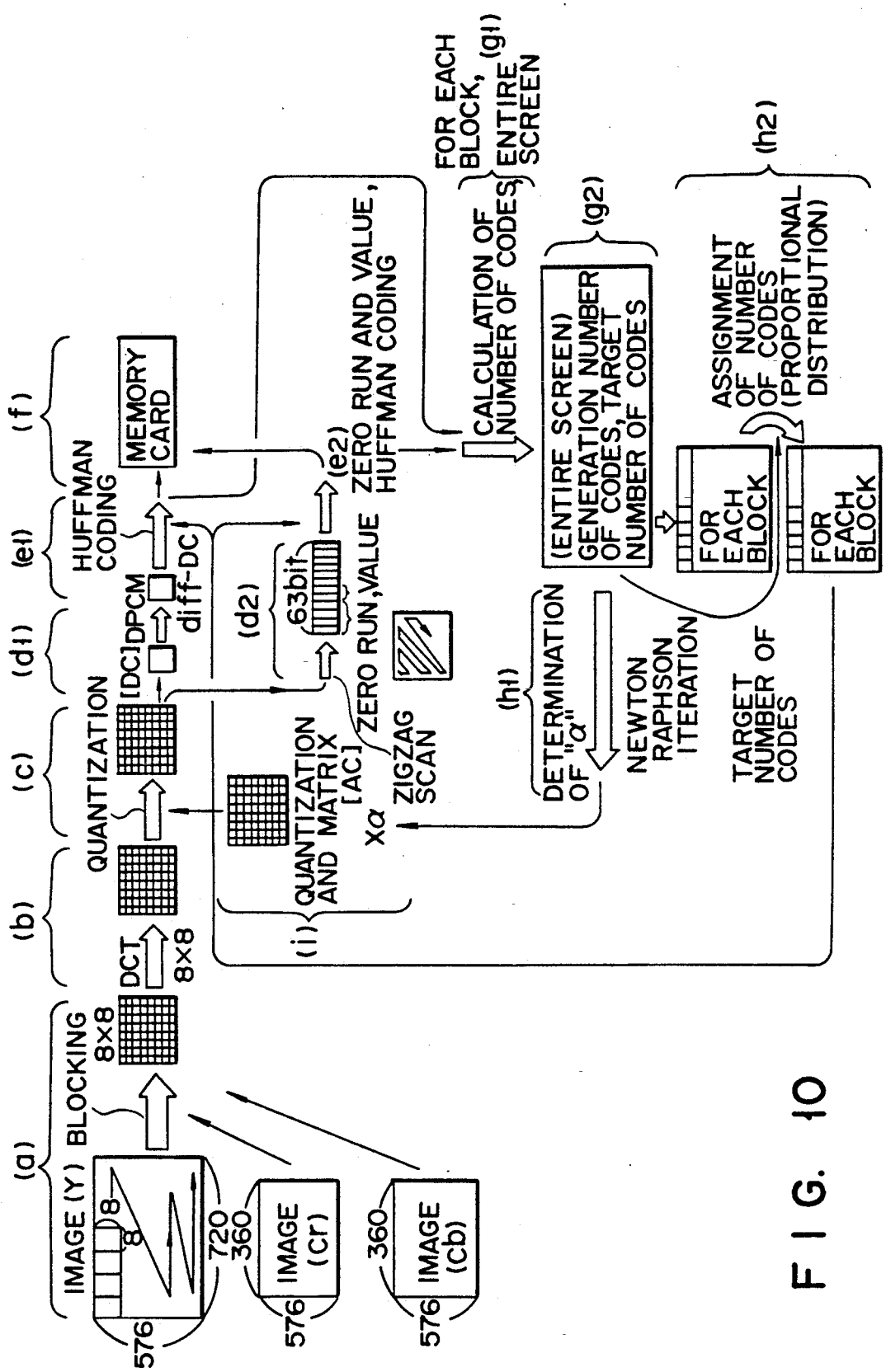
FIG. 10 is an operational transition diagram to explain the operation of the circuit in FIG. 8.

The following is the description of operations of this apparatus having the above configuration according to FIG. 10.

For photographing, an object image is focused by the camera lens 10 on the image pickup device 12 installed behind the camera lens 10 as an optical image.

The image pickup device 12 converts the focused optical image into image signals to output. The image signal obtained by the image pickup device 12 is sent to the process circuit 14 through the signal line 100, where it is divided into color signal components Y, Cr (R-Y component), and Cb (B-Y component) and provided with gamma control and white balancing.

Among the color image signal components output from the process circuit 14, Y component is given to the A/D conversion circuit 16Y through the signal line 102Y, where it is converted into digital data and output. Cr and Cb components are given to the A/D conversion circuit 16C through the signal line 102C, where they are converted into digital data and output. The outputs of the A/D conversion circuits 16Y and 16C pass through the signal lines 104Y and 104C of the respectively-corresponding system and are recorded in the image memories 18Y and 18C of the corresponding system.

Meanwhile, the blocking circuits 20Y and 20C receive the image data from the image memories 18Y and 18C of the corresponding system through respectively-corresponding signal lines 106Y and 106C to divide the image data into blocks with the specified size. That is, they execute blocking. In this case, each block is provided with the size of $8 \times 8$ pixels as an example. In this embodiment, it is assumed that the blocking circuit 20C blocks the entire Cr image data before blocking Cb image.

Image data of each block divided by the blocking circuits 20Y and 20C is given to the orthogonal transform circuits 22Y and 22C through the corresponding signal lines 108Y and 108C. Then the orthogonal transform circuits 22Y and 22C apply, for example, two-dimensional orthogonal transform based on the discrete cosine transform (DCT) to the blocked input image data (hereafter called block image data) every block. The orthogonal transform based on DCT is the processing to divide a waveform into frequency components and express the components by the same number of cosine waves as the number of input samples.

The orthogonally-transformed block image data (transform corresponding) is stored in the corresponding frequency component position of $8 \times 8$ matrix (that is, it is stored in the matrix provided with the relation in which the origin of the matrix is direct-current component and other positions are alternating-current component and frequency increases as the position becomes far from the origin) and input to the quantization circuits 24Y and 24C through the signal lines 110Y and 110C.

Then, the quantization circuits 24Y and 24C quantize the block image data (transform coefficient) of the first pass (the first time). In the first-time quantization, the transform coefficient is quantized according to the quantization width obtained by multiplying the quantization matrix for each previously-set frequency component (this is determined corresponding to each matrix position of block) by the standard (temporary) quantization width. In this case, it is permitted that the same quantization matrix is used for two quantization circuits 24Y and 24C. However, better results can be obtained by setting a quantization matrix suitable for each circuit.

The quantized block image data (transform coefficient) is input to the entropy-coding circuits 26Y and 26C through the signal lines 112Y and 112C, where it is entropy-coded.

The entropy-coding circuits 26Y and 26C zigzag-scans the input quantized transform coefficients in the sequence shown in FIG. 9 from low to high frequency components. That is, transform coefficients are stored in the $8 \times 8$ matrix by corresponding to frequency components so that the frequency will decrease as it is closer to the origin. Therefore, transform coefficients can be scanned from low to high frequency components through zigzag scan as shown in FIG. 9.

Because the first data in the scanning sequence in FIG. 9 is the direct-current component DC, the data for the direct-current component DC Huffman-codes the differential value "diff-DC" from the direct-current component DC of the block (preceding block) entropy-coded immediately before ((d1), (e1)).

For the alternating-current component AC, transform coefficients are sequentially checked from the second through 64th ones in the scanning sequence in FIG. 9. If a transform coefficient not equal to 0 (that is, valid) is found, it is provided with two-dimensional Huffman-coding according to the consecutive number of zero coefficients (invalid) present immediately before the valid coefficient and the value of the valid coefficient ((d2), (e2)).

Also, the entropy-coding circuits 26Y and 26C provide the code of EOB (end of block) indicating the end of a block if invalid coefficients continue from a coefficient through the 64th coefficient.

And they output the number of codes generated in the block to the number-of-code calculating circuit 28 through the signal lines 114Y and 114C (g1) and execute the above processing for all blocks for one-frame images.

Meanwhile, the number-of-code calculation circuit 28 calculates the number of codes for each block of Y, Cr, and Cb components and accumulates the number of codes (g2) in order to calculate the number of codes for one image for each of the input Y, Cr, and Cb components, and outputs the data for the number of codes for each block to the number-of-code assignment circuit 32 through the signal line 118. The number-of-code assignment circuit 32 writes the data for the number of codes for each block in the number-of-code information table as the information for the number of codes at the position of the block concerned.

After data in all blocks for one-frame images is Huffman-coded, the number-of-code calculation circuit 28 outputs the data for the number of codes for the entire image to the quantization width estimation circuit 30 through the signal line 116 and also outputs the data to the number-of-code assignment circuit 32 through the signal line 118.

The quantization width estimation circuit 30 estimates an optimum quantization width coefficient α to approach the target number of codes with the input data for the number of codes for the entire image and the data for the target number of codes, using, for example, the Newton-Raphson iteration method according to the actually used quantization width coefficient (see FIG. 10 (h1)).

Also, the number-of-code assignment circuit 32 calculates the number of codes to be assigned to each block with the input number of codes for each block, the number of codes for the entire image, and the target number of codes by, for example, proportionally distributing the target number of codes with the ratio of number of codes for each block (see FIG. 10 (h2)).

Concretely, the number of codes to be assigned to a certain block is determined by multiplying the number of codes for the block concerned by the target number of codes and dividing the product by the number of codes for the entire image.

And the data for the calculated number of codes to be assigned to each block is stored in the table of data for number of codes to be assigned to each block. The data for the number of codes to be assigned to each block in the table of data for number of codes to be assigned to each block is given to the coding stop circuits 34Y and 34C through the signal lines 120Y and 120C when data for the block concerned is entropy-coded.

This completes the first pass or the first coding (statistical processing) for determination of the number of codes to be assigned to each block and optimization of quantization width.

Then, the second-pass processing starts. The second-pass processing is the second coding (coding processing) to obtain the final coding output optimized so that the number of codes will be kept at the target number of codes.

In this processing, the image data for each system stored in the image memories 18Y and 18C is input to the corresponding blocking circuits 20Y and 20C through the corresponding signal lines 106Y and 106C, where the data is blocked again (a).

The blocked image data is input to the orthogonal transform circuits 22Y and 22C through the signal lines 108Y and 108C corresponding to each system, where the data is orthogonally transformed (b). The transform coefficient obtained through the orthogonal transform is input to the corresponding quantization circuits 24Y and 24C through the signal lines 110Y and 110C, where the data is quantized (c).

However, the quantization width coefficient α used in this case is the estimated optimum quantization width coefficient calculated by the quantization width estimation circuit 30.

Then, the transform coefficient of the quantized block image data is input to the entropy-coding circuits 26Y and 26C through the signal lines 122Y and 122C.

In entropy coding, similarly to the case of statistical processing, the differential value "diff-DC" of the direct-current component DC is Huffman-coded among transform coefficients of the block image data ((d1), (e1)) before the alternating-current component AC is provided with two-dimensional Huffman coding by sequentially extracting data through zigzag scan ((d2), (e2)).

However, whenever a Huffman code to one element (one position in the matrix) is generated, the assigned number of codes to be sent at the element position concerned stored in the table of data for number of codes to be assigned to each block is output to the coding stop circuits 34Y and 34C from the number-of-code assignment circuit 32 through the signal lines 124Y and 124C. Meanwhile, the coding stop circuits 34Y and 34C do not generate a stop signal according to the input number of codes to be assigned to each block unless the assigned number of codes is exceeded after sending the number of codes to be sent and the code EOB input through the signal lines 124Y and 124C but they subtract the number of codes to be sent from the number of codes assigned to the block concerned.

When the sum of the number of codes to be sent assigned to the block concerned and the code EOB exceeds the remaining assigned number of codes, the coding stop circuits 34Y and 34C output the stop signal to the entropy-coding circuits 26Y and 26C through the signal lines 126Y and 126C to end Huffman coding of the block.

Then the entropy-coding circuits 26Y and 26 start Huffman coding of the data for the next block obtained through the quantization circuits 24Y and 24C.

Therefore, the entropy-coding circuits 26Y and 26C output the transformed Huffman code to the code output circuit 36 unless the stop signal is output from the coding stop circuits 34Y and 34C through the signal lines 126Y and 126C and output the code EOB to the code output circuit 36 through the signal lines 128Y and 128C when Huffman coding for all elements of matrix ends before the stop signal is generated.

If the stop signal is input before Huffman coding for all elements of matrix ends, the entropy-coding circuits 26Y and 26C output the side EOB to the code output circuit 36 through the signal lines 128Y and 128C instead of the code to be Huffman-coded.

And the entropy-coding circuits 26Y and 26C starts Huffman-coding of the data for the next block obtained from the quantization circuits 24Y and 24C.

When all blocks of the images for one screen are processed by repeating the above operations, every coding processing ends.

When the processing ends, optimized Huffman-coded data for one-frame images are written in the memory card 38 (f).

This is executed by the output of the code output circuit 36. The code output circuit 36 writes data in the memory card 38 by combining variable-length Huffman codes from the entropy-coding circuits 26Y and 26C input through the signal lines 128Y and 128C and giving combined codes to the memory card 38 through the signal line 130 (f).

It is possible to write data in the memory card 38 by the output of the code output circuit 36 at the same time when the second pass ends. However, it is also possible to write data in the memory card 38 each time the combined variable-length Huffman codes reach one byte or several bytes immediately after the first pass ends and the second pass is executed.

Figure 11A:
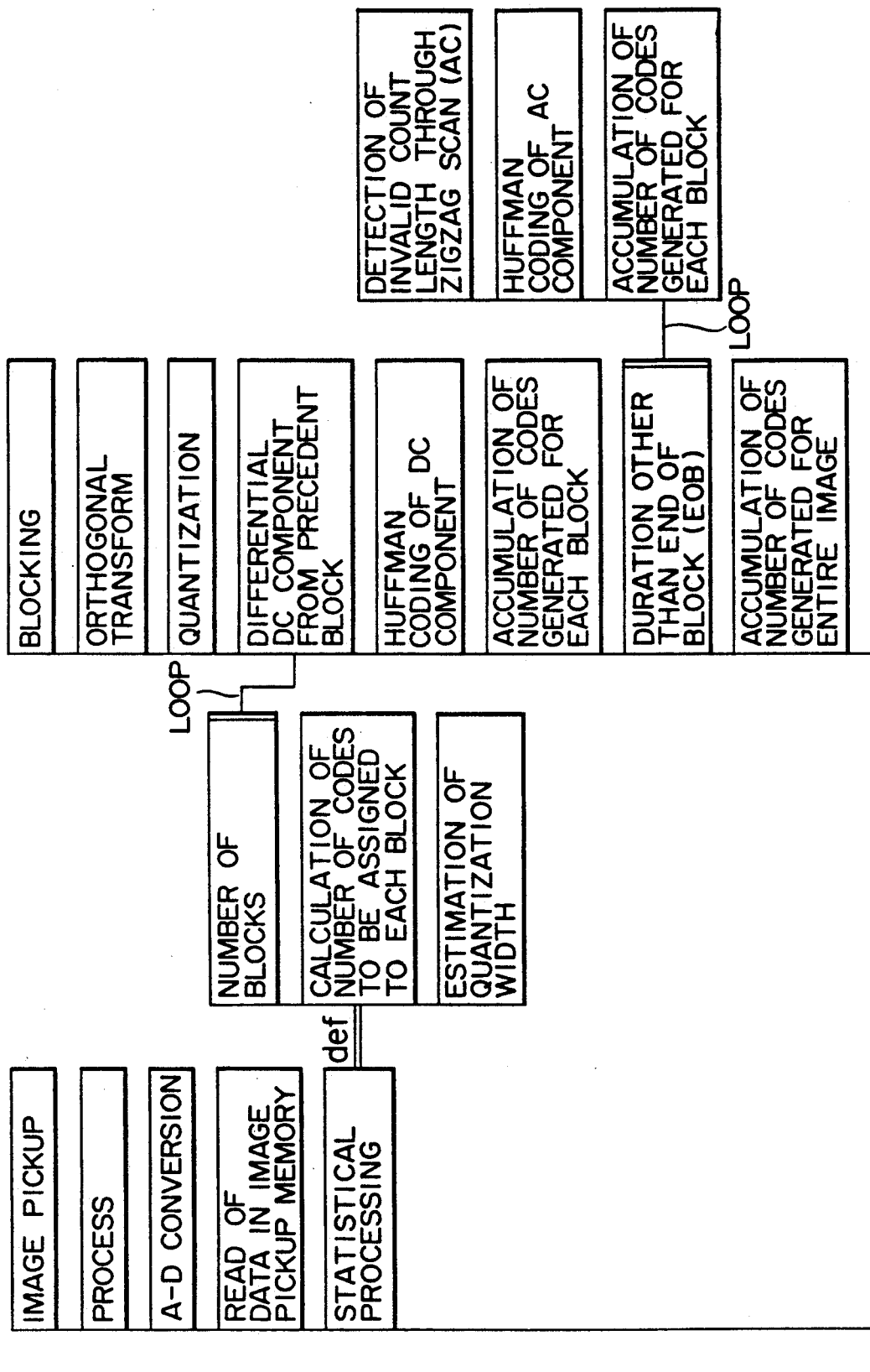
FIGS. 11A and 11B are a flow chart to explain the operation of the circuit in FIG. 8.
Figure 11B:
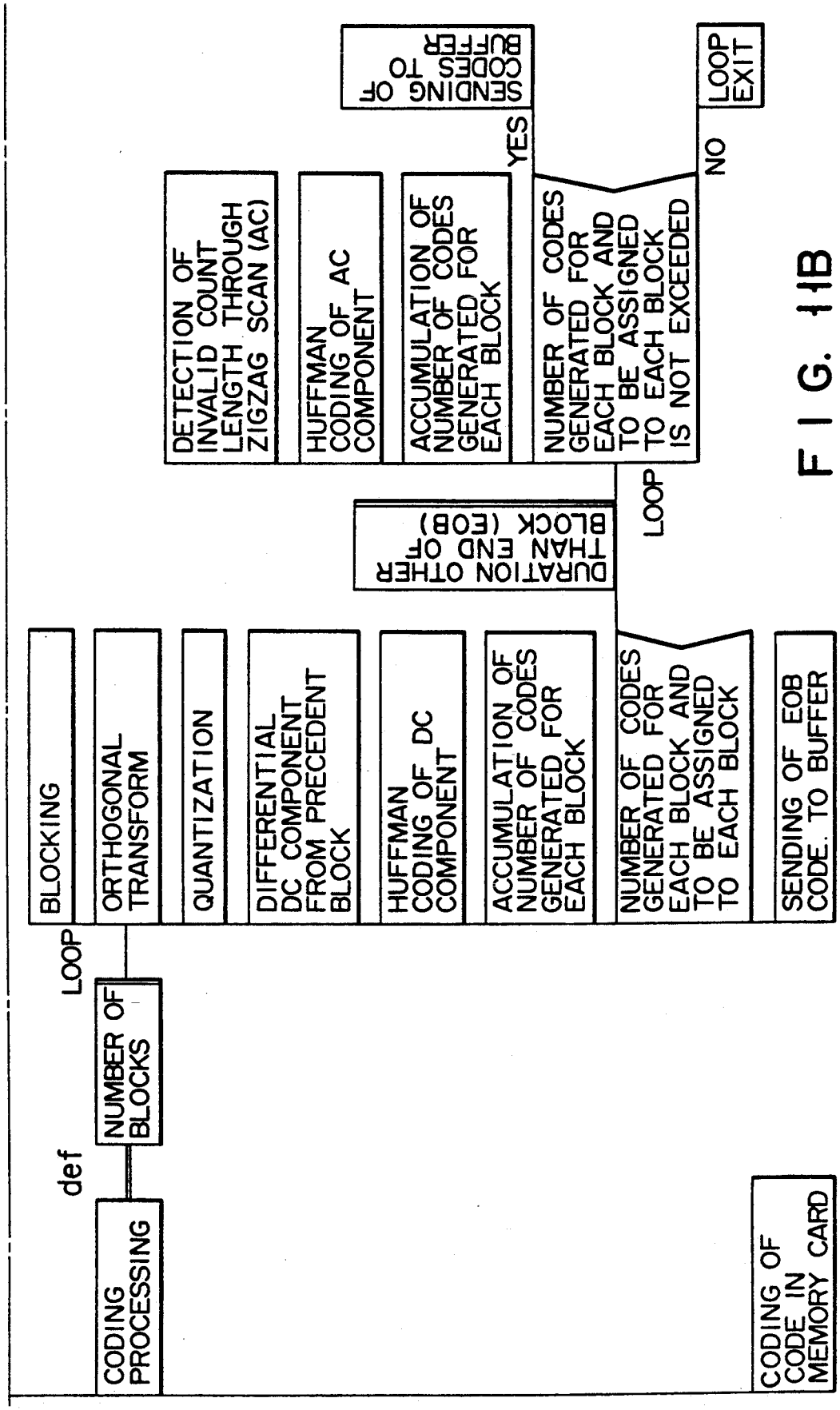

FIGS. 11A and 11B are the PAD flow chart showing the above processing.

This apparatus makes the number of codes for coding processing approach the target number of codes by executing statistical processing using a temporary quantization width to estimate an optimum quantization width according to the statistical data and prevents the number of codes for coding processing from exceeding the purposed number of codes by determining the number of codes to be assigned to each block. This is the important point of the present invention.

Therefore, the block size, type of orthogonal transform, and type of entropy coding are not restricted to those used for this embodiment. Meanwhile, it is better to set the image memories 18Y and 18C between the orthogonal transform circuits 22Y and 22C and the quantization circuits 24Y and 24C because the processes for blocking and orthogonal transform can be omitted for coding processing. In this case, however, the image memory size increases in order to keep the accuracy.

It is also possible to design the process circuit 14 so that it will execute digital processing after A/D conversion.

Because this apparatus starts entorpy coding for each block with the low-frequency component side and uses high-frequency component having a relatively small influence on image quality by coding it so that the assigned number of codes will have an allowance, degradation of image quality can be minimized and efficient-compression coding can be executed.

The above example purposes still images. This technique can also be applied to dynamic images. To purpose dynamic images, however, more efficient compression is possible depending on a design. That is, the above mentioned example shows a technique for the processing in one-frame images without considering the relation with other frame images.

For dynamic images, however, only a part of adjoining frame images changes unless a scene changes. Therefore, very small displacement of each pixel only occurs in adjoining frames within a given short time. When assuming three-dimensional data obtained by arranging several adjoining frames according to time base, it is known that similar values are distributed in a large probability on a spherical surface centering around the origin (DC component) in the distribution of three-dimensional DCT coefficient data. In other words, the constant-height surface of the amplitude of three-dimensional DCT coefficient easily becomes spherical centering around the origin.

With the theory, it must be possible to efficiently compress data by gradually decreasing DCT coefficient values according to progress of scan so that zero values will finally continue. The present invention further improves the compression efficiency with entropy-coding circuits by assuming several adjoining frames as a group and converting a three-dimensional data string like the above.

FIG. 1A shows a configuration example of the image data coding apparatus for dynamic images of the present invention according to the above idea. Because this is basically same as the example in FIG. 8, the same symbol is given to the same functional element and its explanation is omitted.

The configuration in FIG. 1A converts the image signals obtained by the image pickup device 12 into digital signals (image data) through the A/D converter 16 before storing the image data in the image memory 18 and reads the image data stored in the image memory 18 to sequentially convert it into Y, R-Y, and B-Y signals with the video process section (process circuit) 14. The image memory 18, as shown in FIG. 1B, has the first image memory 18a and the second image memory 18b having the capacity for 8 frames respectively, which uses the memories so that one will be used for write while the other will be used for read by switching systems with the selector switches 18c and 18d.

Figure 3:
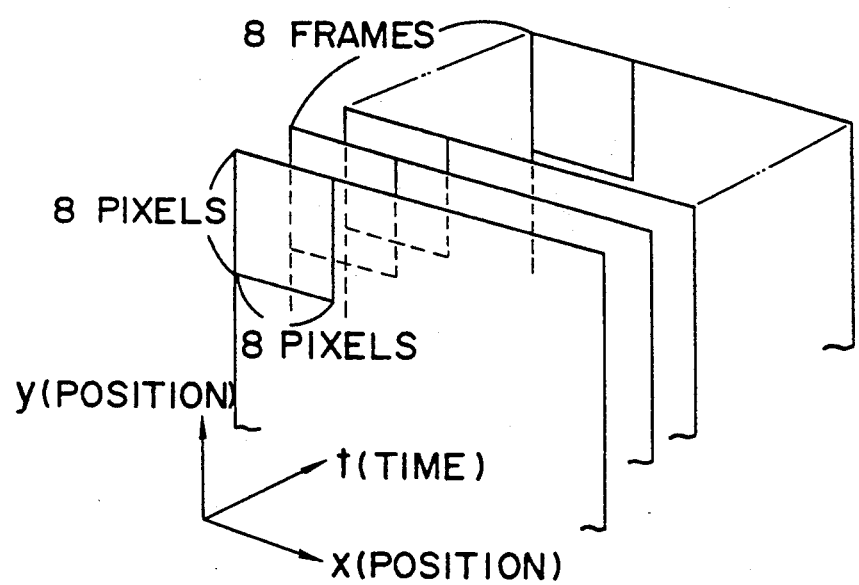
FIG. 3 is a figure showing an example to obtain blocks for $8 \times 8 \times 8$ pixels from eight adjoining frames.
Figure 4A:
FIGS. 4A through 4J and FIG. 5 are drawings to explain a scan example used to transform three-dimensional DCT coefficient data into one-dimensionally-arranged DCT coefficient data.
Figure 4B:
Figure 4C:
Figure 4D:
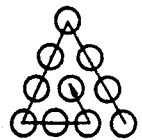
Figure 4E:
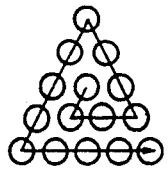
Figure 4F:
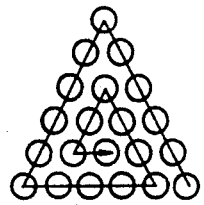
Figure 4G:
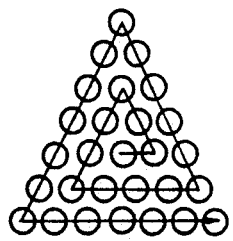
Figure 4H:
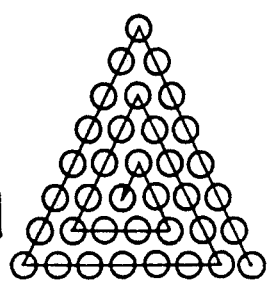
Figure 4I:
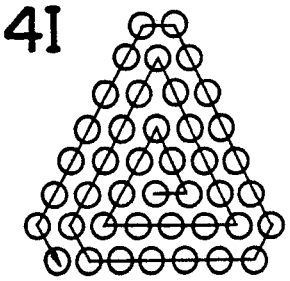
Figure 4J:
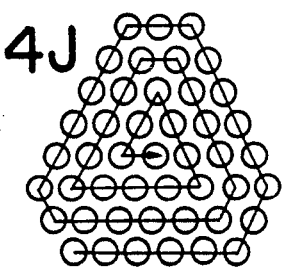

That is, the image detected by the image pickup device 12 is converted into digital data by the A/D converter 16 before it is stored every 8 frames by control of the memory control section 40 and the stored image data is read every three-dimensional block ($8 \times 8 \times 8$ pixels) shown in FIG. 3.

Then, the data is sequentially converted into Y, R-Y, and B-Y signals by the video process section 14 and input to the three-dimensional DCT circuit 222.

Then, the data is provided with discrete cosine transform (DCT transform) by the three-dimensional DCT circuit 222 and the DCT coefficient data obtained through the DCT transform is input to the buffer memory 41.

For the DCT processing in the three-dimensional DCT circuit 222, as shown in FIG. 1C, DCT for each element of the read three-dimensional block ($8 \times 8 \times 8$ pixels) in the x-axis direction is first executed for each read block by the one-dimensional DCT 222a, DCT for each element in the y-axis direction is secondly executed for the three-dimensional block ($8 \times 8 \times 8$ pixels) based on one-dimension DCT coefficient data obtained through the above DCT by the one-dimensional DCT 222b, and DCT for each element in the z-axis direction is thirdly executed for the three-dimensional block ($8 \times 8 \times 8$ pixels) based on two-dimensional DCT coefficient data obtained through the above second DCT by the one-dimensional DCT 222c to obtain the three-dimensional block (8×8×8 pixels) based on three-dimensional block DCT coefficient data.

Thus, three-dimensional DCT coefficient data for pixels of three-dimensional block is obtained and stored in the buffer memory 41. The DCT coefficient data temporarily stored in the buffer memory 41 is read by control of the memory control section 42 through, for example, the scan shown in FIGS. 4A through 4J. The buffer memory 41, as shown in FIG. 1D, has the first buffer memory 41a and the second buffer memory 41b having the capacity for 8×8×8 pixels respectively, which uses the memories so that one will be used for write while the other will be used for read by switching systems with the selector switches 41c and 41d.

For the scan in FIGS. 4A through 4J, data is scanned by spirally scanning each plane obtained by shifting one dot by one dot on the x-, y-, and t-axes centering around the origin for the three-dimensional block based on 8×8×8 DCT coefficient data. For example, the data at the origin (0, 0, 0) of the t-axis is first scanned, the data at the position (1, 0, 0) is secondly scanned, the data at the position (0, 1, 0) is thirdly scanned, and the data at the position (0, 0, 1) is fourthly scanned, and scan is similarly executed for the positions (2, 0, 0)→(1, 1, 0)→(0, 2, 0) (0, 1, 1) (0, 0, 2)→(1, 1, 1)→, etc.

The above scan is controlled by the memory control section 42. The scan shown in FIGS. 4A through 4J is executed so that DCT coefficient values will decrease according to progress of scan and finally only zero values will continue by using the fact that similar three-dimensional DCT coefficient values tend to be distributed on a spherical surface centering around the origin (DC component) in view of the probability, that is, the constant-height surface of the amplitude of three-dimensional DCT coefficient easily becomes spherical centering around the origin.

By converting a three-dimensional data string into the above one-dimensional data string, the effect of compression by the entropy coding circuit 26 can be increased as mentioned later. However, because spherical read of data in the buffer memory 41 is difficult and a large circuit is required, the scan shown in FIGS. 4A through 4J requiring only increment and decrement of address is executed as an example. If a complex circuit does not matter, spherical two-dimensional scan is allowed.

Processing after the quantization circuit is the same as that explained in FIG. 8. Then, data is recorded in the mass storage 44 (e.g. a VTR and disk) through the correction-code addition circuit 45 to finally add an error correction code and the modulated-record modulation circuit 43 to execute modulation for recording data or transmitted.

It is possible to stop the scan in FIGS. 4A through 4J by the scan of No. (h). This is because the frequency component is diagonally cut by an optical filter on the image pickup device in order to multiplex the color-difference signal when converting the spatial frequency component of television signal into NTSC signal since the diagonal frequency component of the spatial frequency component is not important in view of (a) visual characteristics. Also, because of (b) field (interline; sub-Nyquist sampling in the time-base direction) scan, the component out of the diagonal line of the frequency component is unnecessary in the time-base direction. Therefore, the (c) range of the three-dimensional spatial frequency component is enough.

This is the same as execution of three-dimensional sub-Nyquist in view of spatial frequency.

FIG. 2 shows a configuration example of the memory control section 42 necessary for control of the scan in this case. The configuration in FIG. 2 comprises the 7-bit counter 42a which counts the system clock and is set by the reset signal, the ROM 42b which receives the count output from the 7-bit counter 42a and outputs the specified 7-bit pattern corresponding to the output, and the 3-bit counters 42c, 42d, and 42e for x-, y-, t-, and z-axes which specify the mode for up-count and down-count and obtain the count enable signal according to the output of the ROM 42b, counts the system clock, and are reset by the reset signal. Therefore, the configuration executes spiral scan on the plane approximated to a spherical surface by giving the value counted by the 7-bit counter 42a to the ROM 64b to sequentially select 120 types of patterns, specifying the mode of the 3-bit counters 42c, 42d, and 42e for the x-, y-, and t-axes, specifying the address of the buffer memory 41 through counting enable control, and generating addresses of the x-, y-, and t-axes for the three-dimensional DCT coefficient data consisting of 8×8×8 elements.

This configuration used because each pixel can be specified by 120 types of patterns by scanning the space up to reaching the maximum equilateral triangular area in 8×8×8 DCT coefficient signals from the origin.

Figure 5:
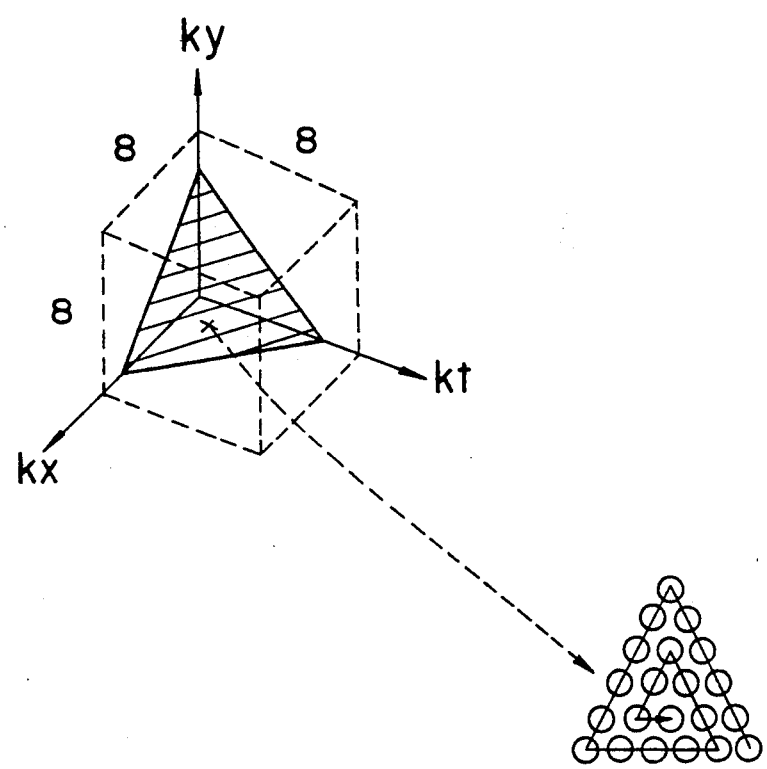

The 120 types of patterns are planes obtained by the fact that scan is started with the origin centering around the origin and the triangular area having an apex on the x-, y-, and t-axes respectively moves on these axes according to progress of the scan as shown in FIG. 7, which are the pattern capable of assigning addresses so that scan can spirally be progressed from the outside to the inside pixels in each plane as shown in FIG. 5.

Because three-dimensional DCT coefficient data is spirally scanned on the plan approximated to a spherical surface in three-dimensional space from the origin of the three-dimensional DCT coefficient data centering around the origin, or the data is arranged into one-dimensional data by grouping data every plane showing the same or similar DCT coefficient values, the components in high frequency area in which zero-run codes tend to be continued can be collected. Therefore, more efficient compression is realized.

Thus, this apparatus three-dimensionally arranges dynamic images for several adjoining frames in order, blocks the three-dimensionally-arranged data into matrix areas with the specified size, applies three-dimensional orthogonal transform to each block, scans three-dimensional DCT coefficient data by spirally scanning the plane approximated to a spherical surface in a three-dimensional space centering around the origin of the three-dimensional orthogonal transform coefficient data, arranges the three-dimensional DCT coefficient data into one-dimensional data by grouping values same as or close to the DCT coefficient every plane to collect components in high frequency area in which zero run codes tend to continue and realize efficient compression, before first applying statistical processing to thus-obtained one-dimensionally arranged DCT data for each block, checking the information content for each block necessary to optimize and the information content for the entire image, and starting the processing to execute optimized coding according to the information obtained through the statistical processing to obtain the coding output as the final output by sequentially controlling entropy coding so that the required number of codes will be kept while checking the coding output.

That is, the final output can be obtained by three-dimensionally blocking the images for several consecutive frames, three-dimensionally arranging data through conversion of each x-axis-directional component of the elements of the three-dimensionally-blocked images into DCT coefficient data (one-dimensional DCT coefficient data), three-dimensionally arranging the three-dimensionally-arranged DCT coefficient data through conversion of each y-axis-directional component of the three-dimensionally-arranged DCT coefficient data into DCT coefficient data (two-dimensional DCT coefficient data), and three-dimensionally arranging the three-dimensionally-arranged DCT coefficient data through conversion of each z-axis-directional component of the three-dimensionally-arranged DCT coefficient data into DCT coefficient data (three-dimensional DCT coefficient data) to obtain three-dimensionally-arranged three-dimensional DCT coefficient data, and then preparing efficient compression with one-dimensionally-arranged DCT data through conversion of totaled planes with approximate data obtained by spirally scanning each plane approximated to a spherical surface in a three-dimensional space centering around the origin of the three-dimensionally-arranged three-dimensional DCT coefficient data into one-dimensionally-arranged DCT data, executing quantization using the standard quantization width coefficient $\alpha$ and entropy-coding of the transform coefficient obtained through the quantization, estimating a coding coefficient $\alpha$ necessary to obtain the optimum number of codes with the information for the number of codes of each element of each block obtained through the entropy coding and the information for the number of codes for the entire image, determining the number of codes to be assigned to each element of each block, shifting the optimum coding of images to be processed according to the above processings to the processing mode, blocking images through execution of the processing mode, quantizing the elements of the blocked image using the estimated quantization width coefficient $Ca$, entropy-coding the transform coefficient obtained through the quantization, entropy-coding the elements concerned within the range of the number of codes to be assigned to each element of each block, and executing the output processing to store all codes of the images to be processed. Therefore, image data can efficiently be compressed and coded, and the obtained image data for a certain number of frames (data for 8 frames in the embodiment in FIG. 1) can be coded so that it will be kept within a certain number of codes. Moreover, when the number of image sheets to be stored is specified, a certain number of sheets to be stored can be assured for the storage capacity of the storing means. Also, because coding processing is executed after determining the number of codes to be assigned to each block for the entire image through statistical processing, coding can be completed with two passes and codes can be optimized within a certain processing time. When this is applied to a digital VTR, a very high compressibility can be obtained. Therefore, it is very useful for high-definition television (HDTV; High-vision). Moreover, the recording time is assured for magnetic tapes and magnetic disk drives whose recording time is specified because coding can be executed so that a certain number of codes will be kept and, even if an error occurs, error propagation can be stopped within a certain number of frames (8 frames in FIG. 1) because processing is completed every a certain number of frames (8 frames in the embodiment). Therefore, image destruction is not spread.

Moreover, by adding address information every a certain number of frames (a certain number of codes), random access (head search) and edition can be executed and high-quality images can be played back for trick playback such as high-speed search, still image, and slow or reverse playback.

The present invention is not restricted to the embodiments described above and shown in figures but can be executed by properly modifying it within the range of the gist. For example, three-dimensional DCT and two-dimensional DCT can alternately be used by connecting the selector switch 223 to the three-dimensional DCT circuit 222 shown in the embodiment of FIG. 1.

That is, for dynamic-image compression, the selector switch 223 is set to the 223-1 side to execute the processing already described in the embodiment of FIG. 1 so that the three-dimensional DCT output can be obtained from the one-dimensional DCT 222c as the final output.

For still-image compression, the selector switch is set to the 223-2 side to obtain the two-dimensional DCT output from the one-dimensional DCT 222b as the final output and also switch the purposed number of codes and quantization width to those for still images. Then, still-image compression is realized by executing the scan of DCT coefficient (read of data in the buffer memory 41) according to FIG. 9.

Figures 14A, 14B:
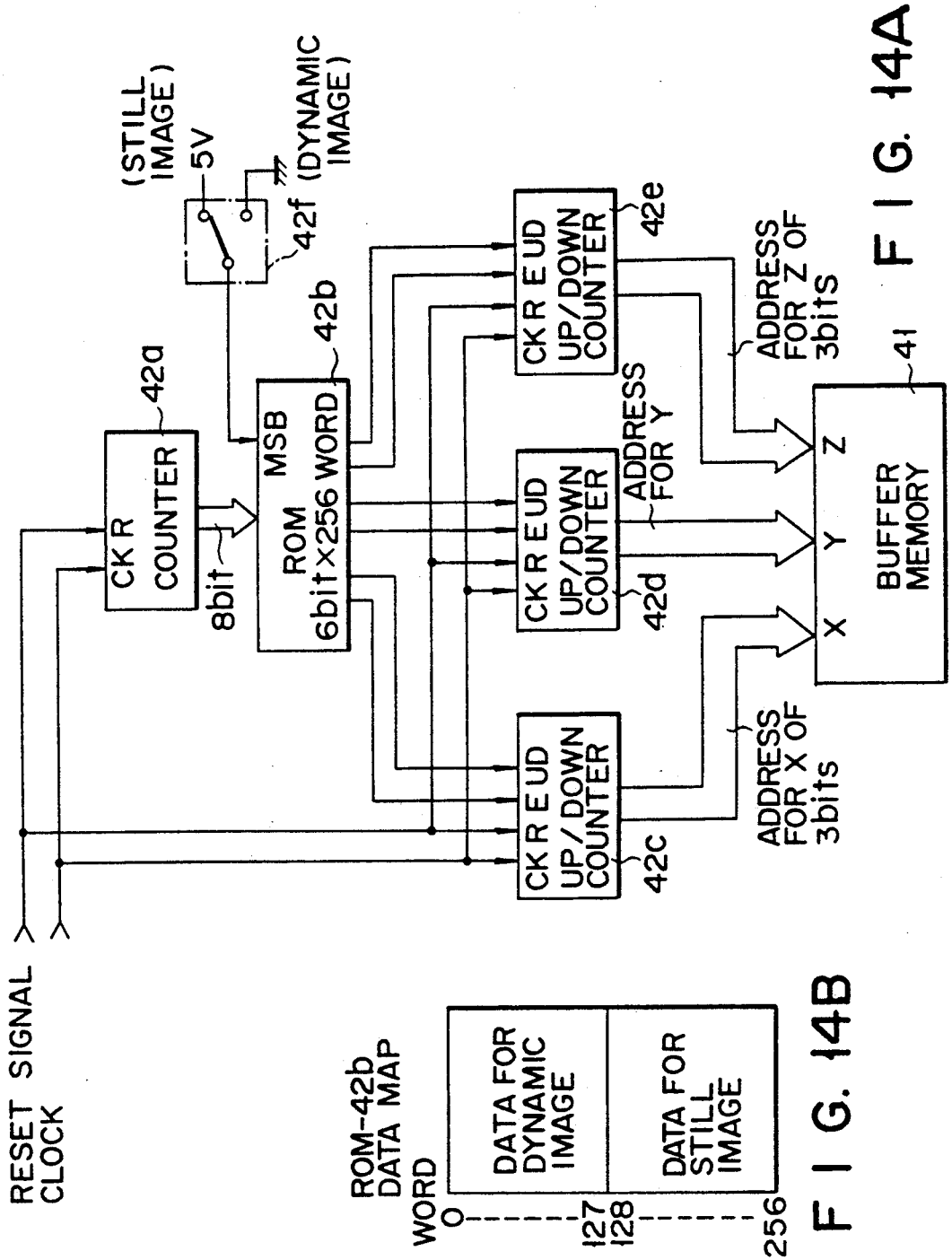
FIGS. 14A and 14B are block diagrams showing a configuration example of the memory control realizing switching of still and dynamic images used for other embodiments of this invention.

In this case, the buffer memory 41 can be operated by using the memory control section 42 with the configuration shown in FIG. 14A. The configuration in FIG. 14A is basically the same as that in FIG. 2. Therefore, if the ROM 42b uses a ROM of 6-bit×256 words, for example, the area of 0 to 127 words of the address space of the ROM 42 is used to stored dynamic-image data and that of 128 to 256 words is used to store still-image data to store output data so that the data for dynamic image can be discriminated from that for still image for each word area.

Then, the areas are switched with the most significant bit (MSB) of address. The areas can be switched by setting the MSB of the address to "H" or "L" with the switch 42f. In this case, the still-image area can be selected by setting the MSB to "H" and the dynamic-image area can be selected by setting it to "L". Other operations are the same as the case in FIG. 2.

According to the above configuration, the compression for dynamic and still images can be switched. If the configuration is applied to a camera-integrated VTR, one-frame photographing is possible. Therefore, it can be used for electronic cameras.

As described above, according to the present invention, the obtained dynamic-image data can efficiently be compressed and coded so that the data will be kept at a certain number of codes or less within a certain processing time. Also, because the total number of codes for a certain number of frames is constant, error propagation can be kept within a certain number of frames. Moreover, special playback processings can be made such as random access, high-speed search, reversal, slow and still operations. Therefore, it is possible to provide a image-data coding apparatus and coding method having features including easy edition.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image data coding apparatus comprising:
   data generating means for generating at least dynamic images;
   data processing means for arranging image data three-dimensionally for several frames adjoining each other among said dynamic image data generated by said data generating means as three-dimensional image data, and for dividing the three-dimensional image data into a plurality of three-dimensional blocks of a specified size, so as to output each three-dimensional block data;
   first transforming means for applying three-dimensional orthogonal transform to said three-dimensional block data output from said data processing means and for outputting three-dimensional transform coefficient data;
   second transforming means for transforming said three-dimensional coefficient data output from said first transforming means into one-dimensionally-arranged transform coefficient data;
   quantizing means for quantizing said one-dimensionally-arranged transform coefficient data transformed by said second transforming means with a specified quantization width and for generating quantization output;
   coding means for coding said quantization output generated by said quantizing means and for outputting coded output; and
   means for obtaining said one-dimensionally-arranged transform coefficient data when said second transforming means scans the plane approximated to a spherical surface formed centering around the DC component of said three-dimensional transform coefficient data sent from said first transforming means according to the specified sequence.

2. An apparatus according to claim 1, wherein said image data includes color image data separated into color components.

3. An apparatus according to claim 1, wherein said first transforming means includes discrete cosine transforming (DCT) means for applying three-dimensional discrete cosine transform to said three-dimensional block data, said discrete cosine transforming means comprising first, second, and third DCT means for obtaining two- and three-dimensional DCT outputs.

4. An apparatus according to claim 3, wherein the image data includes still images, and the apparatus further comprises switching means for selecting said three-dimensional DCT output when said dynamic images are compressed, and for selecting said two-dimensional DCT output when said still images are compressed.

5. An apparatus according to claim 1, wherein said coding means sequentially codes quantization outputs in ascending order from a quantization output having the lowest frequency component until the number of quantization outputs coded reaches a predetermined number.

6. An image data coding apparatus comprising:
   data generating means for generating at least dynamic images;
   data processing means for arranging image data three-dimensionally for several frames adjoining each other among said dynamic image data generated by said data generating means as three-dimensional image data, and for dividing the three-dimensional image data into a plurality of three-dimensional blocks of a specified size, so as to output each three-dimensional block data;
   first transforming means for applying three-dimensional orthogonal transform to said three-dimensional block data output from said data processing means and for outputting three-dimensional transform coefficient data;
   second transforming means for transforming said three-dimensional coefficient data output from said first transforming means into one-dimensionally-arranged transform coefficient data;
   quantizing means for quantizing said one-dimensionally-arranged transform coefficient data transformed by said second transforming means with a specified quantization width and for generating quantization output;
   coding means for coding said quantization output generated by said quantizing means and for outputting coded output;
   means for controlling a first coding to obtain coding output when said apparatus executes quantization with a temporary quantization width, and for controlling a second coding to obtain coding output when said apparatus executes quantization with an optimum quantization width;
   number-of-code calculating means for calculating the number of codes for each specified two-dimensional block in accordance with said coding output obtained by said first coding, and for calculating the number of codes for one-frame images;
   number-of-code assigning means for assigning the number of codes to each two-dimensional block in accordance with the number of codes for each two-dimensional block calculated by the number-of-code calculating means, the number of codes for one-frame images, and target number of codes;
   estimating means for generating estimation output by estimating an optimum quantization width in accordance with the number of codes for one-frame images calculated by said number-of-code calculating means and the target number of codes; and
   means for stopping coding of said coding means when the number of codes assigned to each two-dimensional block by said number-of-code assignment means for said second coding is exceeded.

7. An apparatus according to claim 6, wherein said image data includes color image data separated into color components.

8. An apparatus according to claim 6, wherein said first transforming means includes discrete cosine transforming (DCT) means for applying three-dimensional discrete cosine transform to said three-dimensional block data, said discrete cosine transforming means comprising first, second, and third DCT means for obtaining two- and three-dimensional DCT outputs.

9. An apparatus according to claim 8, wherein the image data includes still images, and the apparatus further comprises switching means for selecting said three-dimensional DCT outputs when said dynamic images are compressed, and for selecting said two-dimensional DCT output when said still images are compressed.

10. An apparatus according to claim 6, wherein said coding means sequentially codes quantization outputs in ascending order from a quantization output having the lowest frequency component until the number of quantization outputs coded reaches a predetermined number.

11. An image data coding apparatus comprising:

first storing means for storing image data for several adjoining frames among generated dynamic image data as three-dimensional image data;

first controlling means for controlling said first storing means in order to divide said three-dimensional image data stored by said first storing means into a plurality of three-dimensional blocks of a specified size and for outputting each three-dimensional block data;

first transforming means for applying three-dimensional orthogonal transform to said three-dimensional block data output from said first storing means and for outputting three-dimensional transform coefficient data;

second storing means for storing said three-dimensional transform coefficient data output from said first transforming means;

second transforming means for controlling said second storing means in order to transform said three-dimensional transform coefficient data sent from said first transforming means into one-dimensionally-arranged transform coefficient data;

quantizing means for quantizing said one-dimensionally-arranged transform coefficient data output from said second transforming means with a specified quantization width for generating quantization output; and coding means for coding said quantization output generated by said quantizing means.

12. An image data coding method comprising the steps of:

obtaining dynamic image data;

arranging image data three-dimensionally for several adjoining frames among said dynamic data, and dividing the three-dimensionally arranged image data for each frame into blocks for matrix areas of a specified size;

applying three-dimensional orthogonal transform to each of the obtained blocks and output three-dimensional transform coefficient data;

transforming said three-dimensional transform coefficient data into one-dimensionally-arranged transform coefficient data;

quantizing said one-dimensionally-arranged transform coefficient data with a specified quantization width and outputting quantization output; and coding said quantization output;

wherein said step of transforming said three-dimensional transform coefficient data includes a step of scanning, in a specified sequence, the plane approximated to a spherical surface formed centering around the DC component of said three-dimensional transform coefficient data.

* * * * *